June 17, 1969     E. P. DIEHL ET AL     3,450,999
HIGH-LOW LIMIT CIRCUIT FOR D-C AMPLIFIER
Filed June 13, 1966
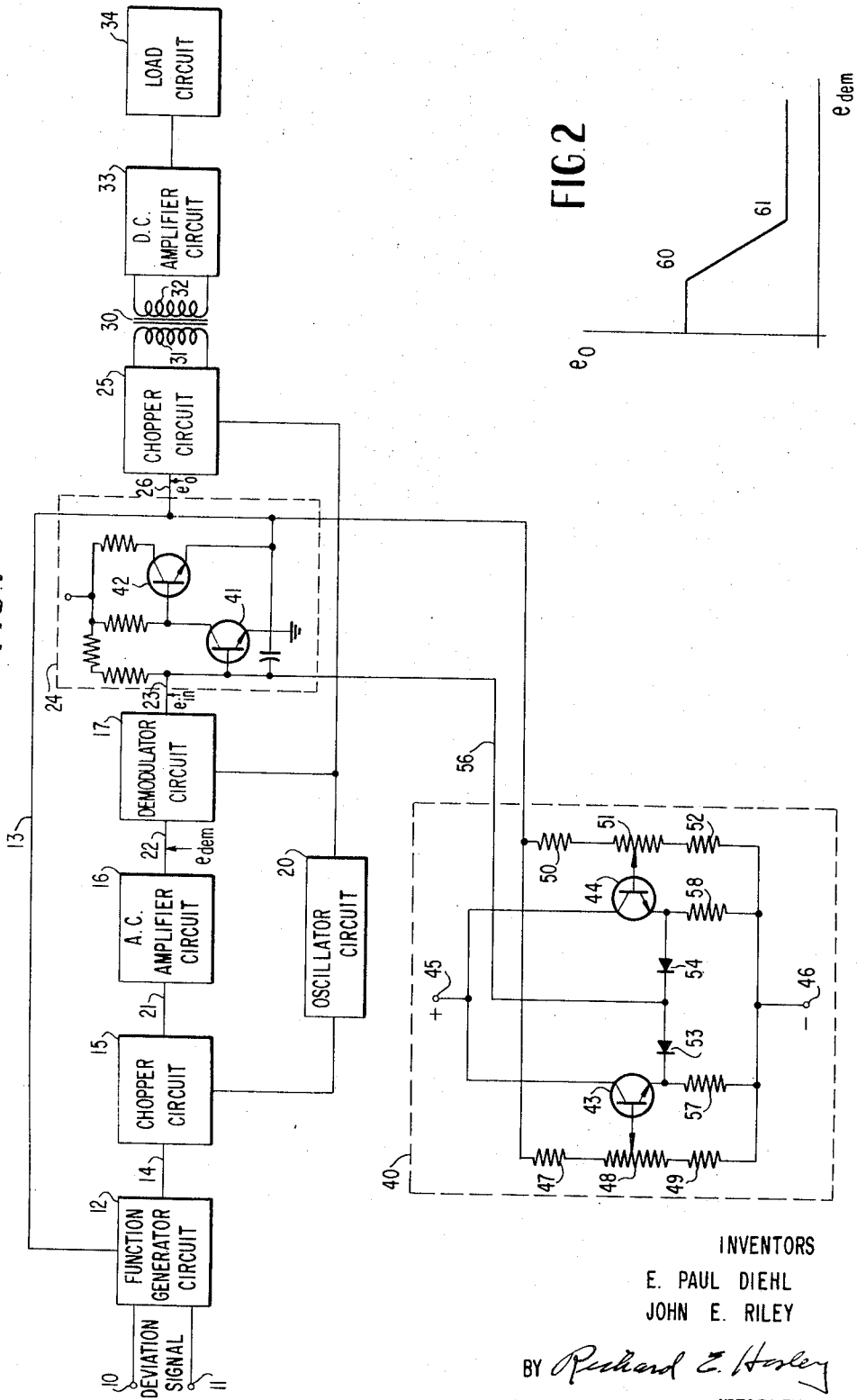
INVENTORS
E. PAUL DIEHL
JOHN E. RILEY
BY Richard E. Horley
ATTORNEY United States Patent Office 3,450,999
Patented June 17, 1969

3,450,999
HIGH-LOW LIMIT CIRCUIT FOR D-C AMPLIFIER
Elmer Paul Diehl, Wakefield, and John E. Riley, Saugus, Mass., assignors to General Electric Company, a corporation of New York
Filed June 13, 1966, Ser. No. 557,123
Int. Cl. H03f 1/02, 3/04, 3/68
U.S. Cl. 330—9   9 Claims

ABSTRACT OF THE DISCLOSURE

A high-low limit circuit for a process controller amplifier. Each of two series circuits in parallel, connects D-C amplifier input and output terminals and includes a diode and transistor which is responsive to the output voltage from the D-C amplifier for biasing the diode into conduction at either a predetermined high or low voltage. Diode conduction clamps the D-C amplifier input at either the high or low level.

Background of the invention

This invention generally relates to direct current amplifiers utilized in process controllers and more particularly to circuits for limiting the output of such a direct current amplifier to a particular range.

Process controllers in the class to which this invention is particularly adapted are generally used to control the operation of a valve operator, or other similar mechanical process control devices, having three possible areas of operation. A first operating area may be defined by a range of controller outputs from a minimum level produced when the direct current amplifier is at a minimum saturation level to the controller output required for a minimum desired operating level; a second operating area, by controller outputs between the minimum desired operating level and its maximum desired operating level; and a third operating area, by a range of controller outputs from the maximum desired operating level to a maximum level produced when the direct current amplifier is at a maximum saturation level. Under normal process operating conditions, the process control device would be energized by the process controller so as to operate in the second area. If an error signal were presented to the process controller which would cause the controller to operate in the first or third areas, control of the process could be lost with an attendant resultant undesirable process operation.

In the prior art, some limit on the process controller output has been provided by feeding a limit signal back to the input of a function generator circuit which may produce reset, rate and/or proportional band functions. However, when limit circuits have been added to process controllers using these function generator circuits, the functions have generally been eliminated by the overriding or swamping effects of the limit signal.

Therefore, it is an object of this invention to provide an improved process controller wherein the output is limited to the second area of operation.

It is another object of this invention to provide an output limit circuit which is easily added to a process controller with a minimum of structural change.

Another object of this invention is to provide a controller output limit circuit which does not affect the input functions of the process controller.

Briefly, this invention provides the above and further objects and advantages by sensing the output voltage of D-C amplifier. If the operating voltage deviates from a value which provides valve operation within the second operating area, a limit circuit connected to the input and output of the D-C amplifier clamps the D-C input signal to a value which limits the output to either a maximum or minimum value depending upon whether the output would otherwise cause operation in the first or third operating areas.

This invention has been particularly pointed out in the appended claims. The above and further objects and advantages of the system may be better understood by reference to the following description of a process controller which incorporates an output limiting means especially when taken in conjunction with the attached drawings.

Brief description of the drawings

FIGURE 1 schematically represent a process controller including this invention; and
FIGURE 2 presents a graphical analysis of the operating characteristics of such a circuit.

Description of an illustrative embodiment

Generally in these process controllers a deviation signal is provided by comparing two electrical signals which individually represent a predetermined operating parameter, commonly known as the set point signal, and the actual operating parameter. The difference between these two signals appears as a deviation, or error, signal which is applied across input terminals 10 and 11 of a function generator circuit 12. The function generator circuit 12, which can comprise a plurality of circuits including a rate circuit, a reset circuit, a proportional band adjustment circuit or some combination of these circuits, is well-known in the art so it is felt that additional comment on this type of circuit and the operation thereof is not required. Suffice it to say that the deviation signal appearing at the terminals 10 and 11 and a feedback signal, which is obtained in a manner to be hereinafter described and which is transferred to the function generator circuit 12 by a feedback conductor 13, are converted to a direct current output signal voltage which generally varies over a fairly wide range (e.g., 7 through 37 volts).

The output from the function generator circuit is coupled by a conductor 14 to a chopper circuit 15 which serves as an input for an A-C amplifier circuit 16 and a demodulator circuit 17. The chopper circuit 15 and the demodulator circuit 17 are synchronized by means of an oscillator circuit 20; and this circuit configuration, including the chopper circuit 15, the A-C amplifier circuit 16, the demodulator circuit 17 and the oscillator circuit 20, is utilized to minimize drift which would otherwise occur if straight, D-C amplification were used.

More specifically, the chopper circuit 15 converts the D-C signal appearing on the conductor 14 to a pulsating D-C signal on the conductor 21 which is coupled to the A-C amplifier circuit 16 whereupon it is amplified to a large voltage, designated as "$e_{dem}$," to be applied by means of a conductor 22 to the demodulator circuit 17. In the demodulator circuit 17, the amplified A-C signal is converted to a D-C signal which appears on a conductor 23 and which varies over a very narrow range. For example, in a controller which provides from 10 ma. to 50 ma. current into a 600 ohm load, the signal could be 0.5 volt nominally and vary only 40 millivolts to produce a full excursion of the load current. This signal is designated as "$e_{in}$" in FIGURE 1.

This signal is then amplified by a D-C amplifier circuit 24 and fed to a second chopper circuit 25 as a voltage designated by "$e_o$" on conductor 26, the chopper circuit also being synchronized by the oscillator circuit 20. By converting the output voltage, $e_o$, to a pulsating D-C voltage in the chopper circuit 25, isolation can be obtained; and a typical isolating circuit is diagrammatically represented by a transformer 30 having a primary 31 energized by the output of the chopper circuit 25. A secondary winding 32 energizes a D-C power amplifier circuit 33 which converts the pulsating D-C voltage on the secondary 32 to a current for energizing a load device 34 such as a valve operator.

The operation of this class of process controller is well-known in the art. If a deviation signal appears at the input of the function generator circuit 12, an output from the function generator circuit 12 causes the current through the load 34 to vary to minimize the deviation signal.

In order to limit the load current to a normal operating region such as the second defined operating area, a limiting circuit 40 is associated with the controller and particularly with the D-C amplifier circuit 24 merely by connecting it to a power supply, the input of the D-C amplifier circuit 24 and the output circuit thereof. In order to clearly understand the operation of the limiting circuit 40 and how it affects the current into the load circuit 34, it will be helpful to first describe one embodiment of a D-C amplifier circuit 24 in detail.

The D-C amplifier shown in FIGURE 1 is constituted by a first transistor 41 and a second transistor 42. The collectors of the two transistors are resistively coupled to a source of positive potential, and the emitter of the first transistor 41 is grounded. The emitter of the second transistor 42 is coupled to ground through the conductor 26 and the chopper circuit 25 and also through the conductor 13 and the function generator circuit 12. The transistors are connected together in a typical configuration with the input to the amplifier being connected to the conductor 23 so that an increase in the D-C input voltage, $e_{in}$, causes a decrease in the D-C output voltage, $e_o$. In other words, the D-C output voltage is inverted with respect to the D-C input voltage by the D-C amplifier. Feedback for the function generator circuit 12 is taken directly from the conductor 26 and the emitter of the second transistor 42 by the conductor 13.

The output voltage from the D-C amplifier circuit 24, $e_o$, also indicates the level of energization of the load circuit 34; and this signal is coupled to the limiting circuit 40 which is constituted by two similar transistors 43 and 44 connected in parallel across a power supply having a positive terminal 45 and a negative terminal 46, the transistors 43 and 44 being connected in an emitter-follower configuration. The conduction of the transistor 43 is controlled by the output voltage, $e_o$, which is impressed across the voltage sensing means including a resistor 47, a potentiometer 48 having its wiper arm connetced to the base of the transistor 43 and another resistor 49 connected in series. A similar circuit including a resistor 50, a potentiometer 51 having its wiper arm connected to the base of the transistor 44 and another resistor 52 connected in series controls the conduction of the transistor 44. As a result of this configuration both transistors 43 and 44 are always conductive; but in the second operating area, defined between the points 60 and 61 shown in FIGURE 2, the potentiometers 48 and 51 are set so both the diodes 53 and 54 remain reversed biased to effectively disconnect the limit circuit 40 from the D-C amplifier 24. Furthermore the conduction levels of the transistors 43 and 44 are different, the levels being determined by the settings of the potentiometers 48 and 51 and the relative values of the resistors 47, 49, 50 and 52. Assume for purposes of this discussion that the transistor 43 has a higher conduction level for a given D-C amplifier output voltage, $e_o$, than the transistor 44.

As the demodulator input voltage, $e_{dem}$, and the input voltage, $e_{in}$, decrease, the output voltage, $e_o$, increases to thereby increase the conduction level of the transistors 43 and 44 until the input voltage reaches the point 60. Any additional decrease in the demodulator voltage, $e_{dem}$, causes the voltage at the emitter of the transistor 44 to forward bias the diode 54. When the diode 54 is forward biased, the output voltage, $e_o$, is reflected to the conductor 23 through the resistor 50, a portion of the potentiometer 51, the base-emitter diode of the transistor 44, the diode 54 and the conductor 56. If the demodulator voltage, $e_{dem}$, decreases further, there is a tendency for the output voltage, $e_o$, to increase which is reflected to the conductor 23 and counteracts any decrease of the voltage, $e_{in}$, from the demodulator circuit so the D-C amplifier output voltage, $e_o$, and the current in the load circuit 34 are held at maximum values. Therefore, the transistor 44 and the diode 54 together with their assocaited circuitry provide a maximum limit on the output voltage of the D-C amplifier circuit 24.

Similarly as the demodulator voltage, $e_{dem}$, and the input voltage, $e_{in}$, increase in the second operating area, the transistors 43 and 44 become less conductive as the output voltage, $e_o$, decreases until the voltage at the emitter of the transistor 43 and across the emitter resistor 57 drops sufficiently, with decreasing conduction of the transistor 43, to forward bias the diode 53. When the diode 53 does become forward biased, the input voltage, $e_{in}$, must follow the voltage on the emitter of the transistor 43 as there is a substantially constant voltage drop across a conducting diode. Therefore, any further increase in the demodulator voltage, $e_{dem}$, tends to increase the input voltage, $e_{in}$, and to decrease the conductive level of the transistor 43. This is reflected back to the conductor 23 as a decreasing voltage in opposition to the change in output of the demodulator circuit 17. Hence, the output voltage, $e_o$, on the conductor 26 and the load current in the load circuit 34 are held at a minimum value for any changes tending to increase the input voltage, $e_{in}$, beyond point 61 as shown in FIGURE 2.

It will be obvious to those skilled in the art that this invention is particularly adapted to any D-C amplifier regardless of its configuration merely by connecting leads to the input and and output terminals of the D-C amplifier. Furthermore, the exact structure of the limiting circuit can be varied without departing from the scope of the invention by using different transistor arrangements or different voltage sensing means. Basically, the invention provides a means for sensing the output voltage of a D-C amplifier and for utilizing the sensing means to control a switching means associated with the input of the amplifier to thereby maintain the output of the D-C amplifier within a predetermined range.

What is claimed as new and desired to be secured by Letters Patent of the United States is:

1. In an amplifier system including a D-C amplifier for amplifying a D-C input signal at an input thereof to produce an inverted D-C output signal at an output thereof, means for producing the D-C input signal and means for utilizing the D-C output signal, the improvement of means for limiting the D-C output signal when the D-C input signal exceeds the predetermined value including:
   (a) output voltage sensing means connected to the D-C amplifier output,
   (b) controllable current conductive means connected to said voltage sensing means and responsive thereto; and
   (c) switching means in series with portions of said voltage sensing means and said conductive means for coupling the D-C amplifier output to the D-C amplifier input, said switching means being rendered nonconductive by said conductive means when the D-C input voltage is below said predetermined value and being rendered conductive, when the D-C voltage input tends to exceed the predetermined value so that the input of the D-C amplifier is clamped substantially at said predetermined output voltage.

2. An amplifier system as recited in claim 1 wherein said controllable current conductive means includes a transistor in an emitter follower configuration with the base of said transistor being coupled to said voltage sensing means and the emitter being coupled to said switching means.

3. An amplifier system as recited in claim 2 wherein said switching means comprises a diode connected to said emitter and said input of said D-C amplifier and poled for conduction when the D-C input voltage exceeds said predetermined value and the emitter voltage causes a voltage drop to exist across said diode which exceeds the forward breakdown voltage of said diode.

4. In an amplifier system including a D-C amplifier for amplifying a D-C input signal at an input thereof to produce an inverted D-C output signal at an output thereof, means for utilizing the D-C output signal, the improvement of means for limiting the D-C output signal when said input signal becomes less than a predetermined voltage including:
  (a) output voltage sensing means connected to the amplifier;
  (b) controllable current conductive means connected to said sensing means and responsive thereto; and
  (c) switching means in series with portions of said voltage sensing means and said conductive means for coupling the D-C amplifier output to the D-C amplifier input, said switching means being rendered non-conductive by said conductive means when the D-C input voltage is above said predetermined value and being rendered conductive, when the D-C input voltage tends to become less than the predetermined value so that the input of the D-C amplifier is clamped substantially at the predetermined output voltage.

5. An amplifier as recited in claim 4 wherein said controllable current conductive means includes a transistor in an emitter follower configuration with the base being coupled to said voltage sensing means and the emitter being coupled to said switching means.

6. An amplifier system as recited in claim 5 wherein said switching means comprises a diode connected to said emitter and to the input of the D-C amplifier and poled for conduction when the D-C input voltage tends to become less than said predetermined value and the emitter voltage causes a voltage drop to exist across the diode which exceeds at forward breakdown voltage.

7. In an amplifying system including an A-C signal source and means for demodulating the A-C signal, D-C amplifying means for amplifying the demodulated signal and D-C signal conversion means for converting the amplified D-C signal to a usable output signal, the D-C amplifier including first and second transistors, the first transistor having collector, base and emitter electrodes coupled to a potential source, the output of the demodulating means and ground respectively and the second transistor having collector, base and emitter electrodes coupled to the potential source, the collector electrode of the first transistor and the D-C signal conversion means respectively and capacitive means coupling the base electrode of the first transistor to the signal conversion means, the improvement of means for limiting the D-C output signal to a range between a first predetermined voltage and a second predetermined voltage wherein the first predetermined voltage is less than the second predetermined voltage including:
  (a) first and second voltage sensing means connected to the second transistor emitter electrode for producing an output signal in response to the D-C amplifier output,
  (b) first and second controllable current conductive means connected to said first and second voltage sensing means respectively, the degree of conductivity of each of said current conductive means being controlled by said voltage sensing means, and
  (c) first and second switching means in series with portions of said first and second conductive means and first and second means respectively to constitute parallel circuits between the D-C amplifier output and D-C amplifier input, said first switching means being rendered conductive when the D-C output voltage is less than said first predetermined voltage and said second switching means being rendered conductive when the D-C output voltage is greater than said second predetermined voltage, said first and second conductive means determining the point of conduction of said first and second switching means so that said input of the D-C amplifier is clamped substantially at one of said predetermined voltages by the output voltage of the D-C amplifier.

8. An amplifying system as recited in claim 7 wherein said first and second current conductive means are constituted by first and second transistors, each of said transistors being connected in an emitter follower configuration with the base of each of said transistors being coupled to one of said voltage sensing means and said switching means being coupled to the emitter of each of said transistors.

9. An amplifying system as recited in claim 7 wherein said switching means comprises first and second diodes, said first diode being connected between the emitter electrode of said first transistor and the input of the D-C amplifier and the second diode being connected between the emitter of the said second transistor and the input of the D-C amplifier, said first diode being poled for conduction when the output voltage from the D-C amplifier is less than said first predetermined voltage and said second diode being conducted when the output voltage from the D-C amplifier exceeds said second predetermined voltage.

References Cited

UNITED STATES PATENTS 3,200,346    8/1965    Young       330—138 X
3,218,542    11/1965   Taylor       307—202 X NATHAN KAUFMAN, *Primary Examiner.*

U.S. Cl. X.R.

330—16, 24, 26